(12) United States Patent
Gao et al.

(10) Patent No.: US 10,972,563 B2
(45) Date of Patent: Apr. 6, 2021

(54) OUT-OF-NETWORK NOTIFICATIONS OF NETWORK-TRANSMITTED CONTENT ITEMS

(71) Applicant: Microsoft Technology Licensing, LLC, Redmond, WA (US)

(72) Inventors: Yan Gao, Los Altos, CA (US); Ajith Muralidharan, Sunnyvale, CA (US); Bethany J. Wang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 163 days.

(21) Appl. No.: 16/237,213

(22) Filed: Dec. 31, 2018

(65) Prior Publication Data

US 2020/0213408 A1 Jul. 2, 2020

(51) Int. Cl.
  *G06F 17/00* (2019.01)
  *H04L 29/08* (2006.01)
  *G06F 16/9535* (2019.01)
  *G06Q 30/02* (2012.01)

(52) U.S. Cl.
  CPC .......... *H04L 67/26* (2013.01); *G06F 16/9535* (2019.01); *H04L 67/306* (2013.01); *G06Q 30/0271* (2013.01)

(58) Field of Classification Search
  None
  See application file for complete search history.

(56) References Cited

U.S. PATENT DOCUMENTS

| | | | |
|---|---|---|---|
| 7,219,153 B1* | 5/2007 | Day | H04L 29/06027 707/999.01 |
| 7,412,599 B1* | 8/2008 | Nathoo | H04L 63/1408 713/156 |
| 8,504,418 B1* | 8/2013 | Dimock | G06Q 30/0239 705/14.19 |
| 9,147,194 B1* | 9/2015 | Le | G06Q 30/0243 |
| 9,197,738 B2* | 11/2015 | Peev | H04M 1/72586 |
| 2007/0207727 A1* | 9/2007 | Song | H04L 12/1877 455/3.06 |
| 2008/0077581 A1* | 3/2008 | Drayer | G06F 16/9535 |
| 2012/0101981 A1* | 4/2012 | Arms | G06F 16/248 707/608 |

(Continued)

*Primary Examiner* — Hasanul Mobin
(74) *Attorney, Agent, or Firm* — Hickman Becker Bingham Ledesma LLP; Daniel D. Ledesma

(57) ABSTRACT

Techniques for identifying and delivering notifications of user-generated content to network-limited users are provided. In one technique, for each selected target entity that has a limited network, one or more topics associated with the target entity are identified and the target entity is assigned to one or more entity-topic buckets for the identified topics. For each selected content item, one or more topics associated with the content item are identified and the content item is assigned to one or more content-topic buckets for the identified topics. The entity-topic buckets are matched to the content-topic buckets, resulting in assigning, for each selected target entity, zero or more content items to that target entity. For each target entity that is assigned one or more content items based on the matching, a notification is generated and transmitted over a computer network to a computing device of the target entity.

20 Claims, 4 Drawing Sheets

(56) References Cited

U.S. PATENT DOCUMENTS

| | | | | |
|---|---|---|---|---|
| 2012/0311140 | A1* | 12/2012 | Kuroda | H04L 67/22 |
| | | | | 709/224 |
| 2012/0311421 | A1* | 12/2012 | Tomono | G06Q 10/06375 |
| | | | | 715/208 |
| 2013/0006602 | A1* | 1/2013 | Zhu | G06F 40/58 |
| | | | | 704/2 |
| 2013/0030907 | A1* | 1/2013 | Lyon | G06Q 30/0277 |
| | | | | 705/14.42 |
| 2014/0095465 | A1* | 4/2014 | Chandra | G06F 16/9535 |
| | | | | 707/706 |
| 2016/0036747 | A1* | 2/2016 | Aalbers | G10L 15/26 |
| | | | | 704/8 |
| 2016/0041982 | A1* | 2/2016 | He | G06F 16/9535 |
| | | | | 707/728 |
| 2016/0078860 | A1* | 3/2016 | Paulik | G10L 15/197 |
| | | | | 704/244 |
| 2017/0262762 | A1* | 9/2017 | Conover | G06Q 50/01 |
| 2017/0337602 | A1* | 11/2017 | Davis | G06Q 30/0607 |
| 2018/0013844 | A1* | 1/2018 | Foged | H04L 67/22 |
| 2018/0285204 | A1* | 10/2018 | Dwarampudi | G06F 11/302 |
| 2018/0367627 | A1* | 12/2018 | Hooda | H04L 67/26 |
| 2019/0334851 | A1* | 10/2019 | Shi | G06F 16/9535 |

* cited by examiner

OUT-OF-NETWORK NOTIFICATIONS OF NETWORK-TRANSMITTED CONTENT ITEMS

TECHNICAL FIELD

The present disclosure relates to online networks and, more particularly to, generating notifications of network-transmitted electronic content items for out-of-network target entities.

BACKGROUND

Online networks are forming at a fast pace. Each day people register with online network providers in order to make virtual connections with others, send messages, share content, and view relevant content. However, initially, newly-registered members to an online network provider have no one in their respective online networks. As a result, notifications of content in which such a member might be interested will not be sent. Thus, the value of the online network provider to newly-registered members is not fully realized. Even after making a few (or even many) connections, a new member might still have limited access to notifications about quality content since the new member's connections might not be active online users that are posting or sharing content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for identifying and delivering notifications of user-generated content to network-limited users are provided. In one technique, user-generated content that satisfies certain criteria is identified and sorted. Also, network-limited users are identified along with their second-degree connections. The second-degree connections are matched with the contributors of the sorted user-generated content. That sorted user-generated content is delivered as notifications to computing devices of the network-limited users.

In another technique, user-generated content is analyzed to identify topics reflected in the content. Content associated with each topic is sorted based on one or more sorting criteria. Also, network-limited users are identified, and one or more interests are identified for each identified network-limited user. The sorted topic-associated content is matched to the interests of the network-limited users. The matched content is delivered as notifications to computing devices of the network-limited users.

Embodiments described herein improve online networks by providing new notification liquidity for under-provisioned registered users. Prior approaches relied solely on notifications from first-degree connections to ensure relevance. Embodiments ensure high quality notifications of user-generated content from out-of-network originators. Embodiments also allow quality content creators with limited networks to reach a wider audience.

Example System

Figure 1:
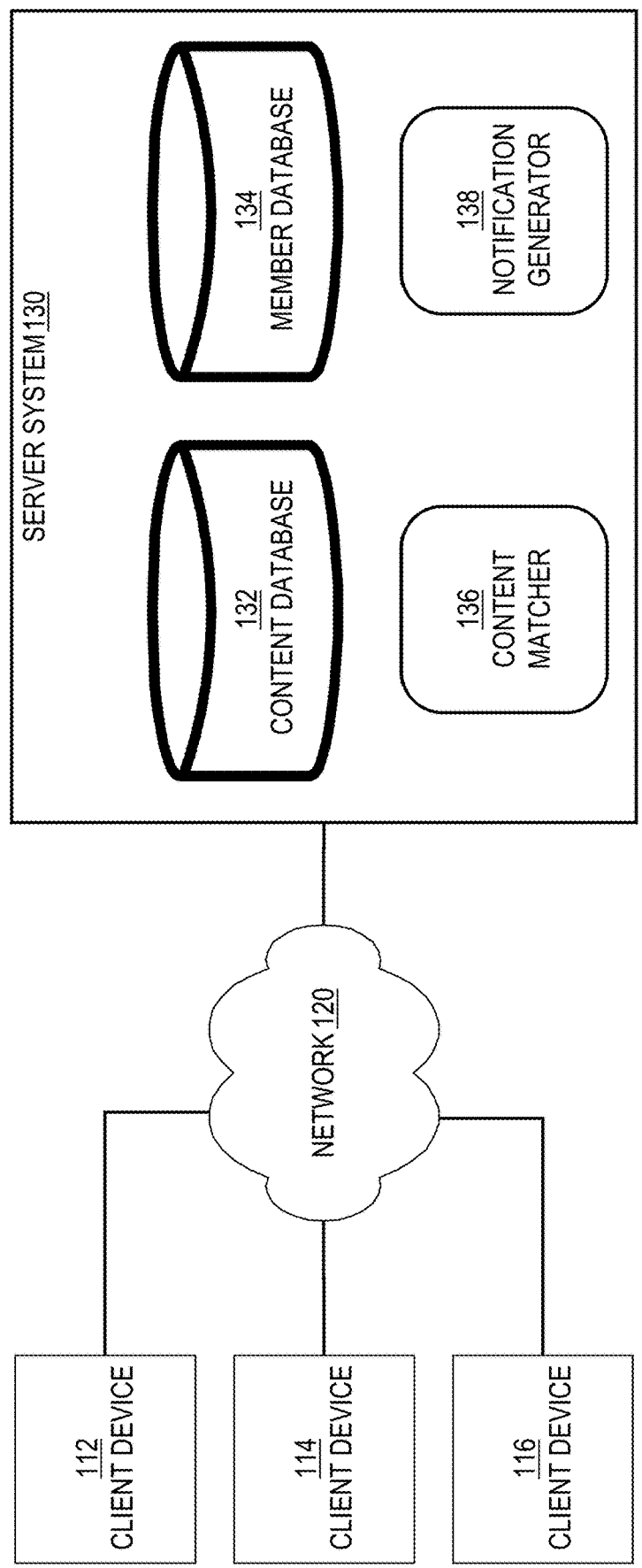
FIG. 1 is a block diagram that depicts an example system for generating notifications based on out-of-network content, in an embodiment.

FIG. 1 is a block diagram that depicts an example system 100 for generating notifications based on out-of-network content, in an embodiment. System 100 includes client devices 112-116, a network 120, and a server system 130. An example of an entity that provides or operates server system 130 is an online social network provider, such as LinkedIn.

Examples of client devices 112-116 include desktop computers, laptop computers, tablet computers, wearable devices, video game consoles, and smartphones. An example of an application that executes on one of client devices 112-116 includes a dedicated application that is configured to communicate with server system 130 over network 120. Another example of an application is a web application that is downloaded from server system 130 and that executes within a web browser running on the client device. Although only three client devices are depicted, there may be many more client devices that are communicatively coupled to server system 130.

Network 120 may be implemented on any medium or mechanism that provides for the exchange of data between client devices 112-116 and server system 130. Examples of network 120 include, without limitation, a network such as a Local Area Network (LAN), Wide Area Network (WAN), Ethernet or the Internet, or one or more terrestrial, satellite or wireless links.

Server System

Server system 130 includes a content database 132, a member database 134, a content matcher 136, and a notification generator 138. Content matcher 136 and notification generator 138 are implemented in hardware, software, or any combination of hardware and software. Each of content database 132 and member database 134 may be implemented on a single storage device or on multiple storage devices. Also, different types of data described as being included in, for example, member database 134 may be segregated from each other and originate from different databases.

Content database 132 comprises data about multiple user-generated content items. A content item may comprise text, graphics, links to other documents (e.g., files), audio, video, or any combination thereof. A "user-generated content item" is a content item whose content is composed by a registered member of server system 130, such as one who operates client device 110. For example, using a user interface provided by server system 130 and displayed on a screen of client device 110, a user of client device 110 enters text and uploads an image to accompany the text. The text and image are transmitted over network 120 to server system 130 and stored in content database 132. A copy of the text and image may be stored in multiple places (not depicted) within server system 130. Server system 130 may determine the format (or "look and feel") of user-generated content, such as the height, width, border effects, and border coloring.

Example data about a content item may include the content itself (or a link or reference to another storage location where the actual content is stored), a member identifier that uniquely identifies the member (or "originator") of the content, one or more attributes of the originator, a timestamp of when the originator uploaded the content to server system 130, a number of views, clicks, likes, comments, and shares the content item has received from other registered members of server system 130, a list of interactions each indicating a member identifier of a member that interacted with the content item, a type of the interaction (e.g., view, click, like, comment, share), a timestamp indicating a date and/or time of day when the interaction occurred, a title of the content item, commentary of the content item, hashtags that users have added to the content item, and/or an indication of whether the content item was recognized as spam/low quality (which may be decided, at least in part, by a relevance model).

Member database 134 includes data about multiple users/entities (members) that are registered with server system 130. Example data about an entity or member include a first name, a last name, an email address, a phone number, an industry in which the member works, an employer name, a job title, list of skills, a work history listing past employers and job titles, academic history listing past academic institutions attended and degrees earned, a number and list of "connections" of other members with which the member has confirmed a connection, a liquidity, a member identifier that uniquely identifies the member, a date when the member registered with server system 130, an interaction log that lists previous interactions with server system 130 (e.g., login dates and times, a list of pages viewed, a list of content items posted viewed/clicked/liked/commented/shared, and one or more references to another storage location where one or more of the above information is stored) along with their respective dates/times, entities (e.g., people or organizations) followed, and/or existing notifications created for the member.

Content matcher 136 identifies, for each member of multiple members, one or more content items to present to the member. Content matcher 136 takes input from content database 132 and member database 134 and matches content items to members, as will be described in more detail below. Output from content matcher 136 may be a series of lists, one for each member of multiple members that is to receive one or more notifications.

Notifications

Notification generator 138 accepts a list of one or more content items and a member identifier and causes a notification of each content item in the list to be sent to a computing device of the corresponding member. Notification generator 138 identifies a computing device on which the member is currently active or logged on with respect to server system 130 or, if not, with which the member is registered to receive notifications.

There are two types of notifications: a push notification and an in-app notification. A push notification is one that is sent to the member's computing device (e.g., a smartphone) and processed by an operating system of the computing device. Such a notification is displayed when the locally-running application (e.g., a mobile application or a web application) that is configured to communicate with server system 130 is not active or is not currently being displayed. Such a notification may be persistent in that it may be displayed continuously (e.g., at the top of the screen) until user input is received to disregard the notification or to view the notification. Alternatively, the notification may be displayed for a limited time (e.g., three seconds) before automatically disappearing from view. Either way, an indication of the push notification may be presented on or adjacent to an icon that represents the locally-installed application.

An in-app notification is a notification that is displayed while the intended recipient is currently interacting with server system 130 (or an affiliated system) through an application, whether a client-side application (e.g., a mobile app) or a web application that executes on, for example, a desktop computer, a laptop computer, a tablet computer, or smartphone. For example, a web application may display multiple user-selectable persistent tabs, one of which corresponds to notifications. Other tabs correspond to other types of content and/or actions, such as a tab for messaging, a tab for editing a user profile, a tab for viewing a "news" feed, and a tab for searching for users, organizations, or groups that satisfy certain user-specified criteria. As another example, a mobile application may display multiple persistent buttons, similar to the persistent tabs, one of which corresponds to notifications. Selecting the notification button (or tab) causes new (or unread) and, optionally, past (or read) notifications to be listed or presented in their entirety.

An in-app notification may be presented for a short period of time when it is received at a client device and then automatically disappear. Alternatively, an in-app notification may be persistent on a computer screen until a user swipes or selects a close button to disregard.

A notification, whether a push notification and an in-app notification may merely: (a) be an indication of the actual content item but not contain any of content of the content item; (b) include a small portion of the actual content item; or (c) include the entirety of the content item. For example, an in-app notification may comprise a small red dot that appears over a notifications tab in a web application while another tab is currently active/open to the corresponding user. As a related example, a small red dot includes a number indicating a number of notifications that have not yet been viewed by the corresponding member. Thus, when a new notification is sent to this member/account, the number increments by one.

A notification may also include age data that indicates when the corresponding content item was originally posted, last liked, last commented on, etc. A notification may include a name (e.g., first and last names) of the originator or author of the corresponding content item. A notification may also include an image (e.g., a profile image) of the originator or author.

A notification may also indicate an action that the originator or author performed, such as posting an article. A notification may also indicate an action that another member (whom the target member might know) performed relative to the content item, such as liking, commenting, or sharing the content item. A notification may also indicate how the content may relate to one or more interests associated with the target member. For example, a notification may specify a topic in which the target member is also associated.

In an embodiment, an email is sent to a user if a notification channel is not available.

Content-Based Fanout

Figure 2:
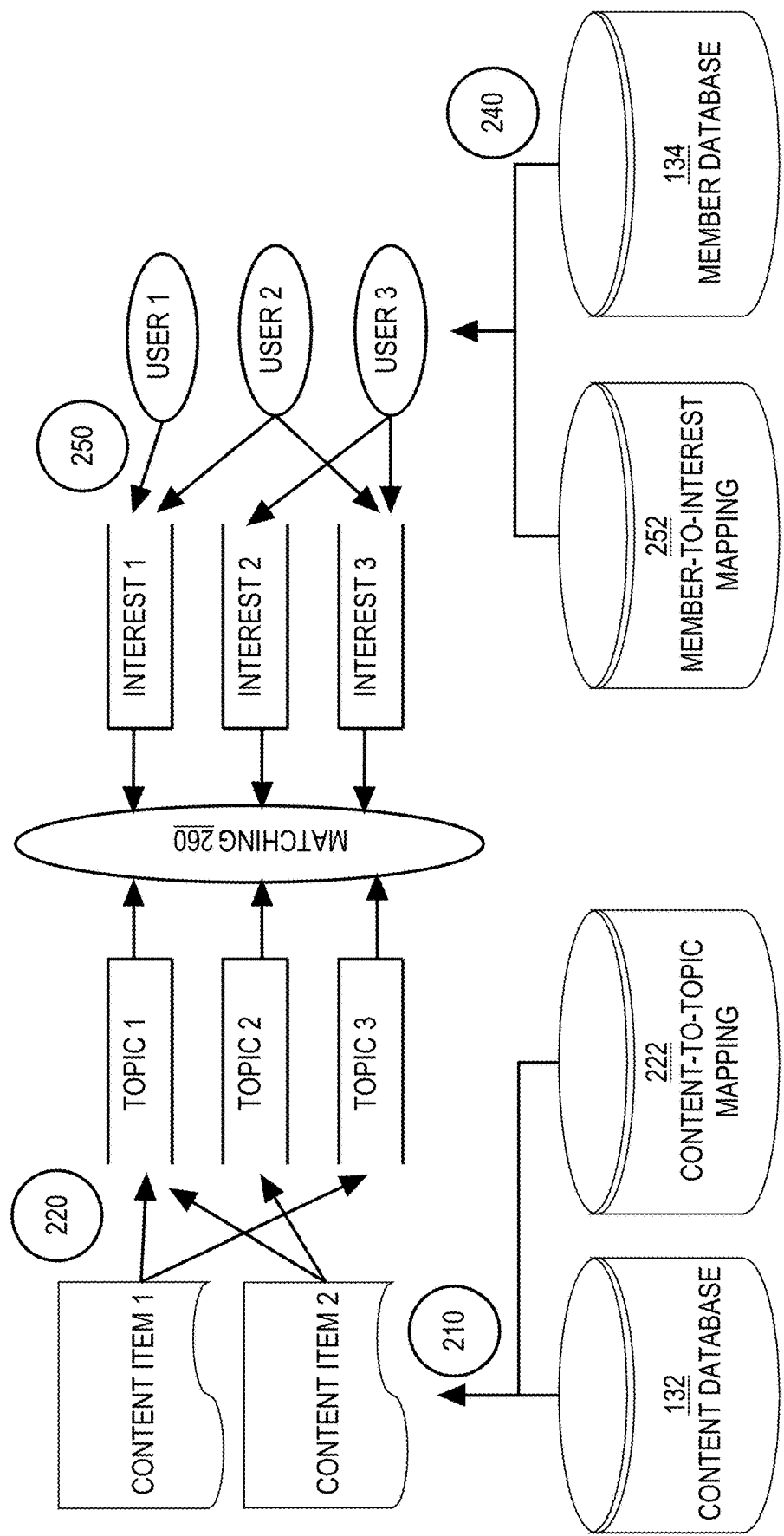
FIG. 2 is a block diagram that depicts an example workflow for generating notifications based on out-of-network content, in an embodiment.

FIG. 2 is a block diagram that depicts an example workflow 200 for generating notifications based on out-of-network content, in an embodiment. Workflow 200 may be implemented by content matcher 136.

At step 210, multiple content items are selected from content database 132 based on one or more filter criteria. One example filter criterion is a certain level or degree of quality, which may be an objective metric that is determined automatically by a process or program, a subjective metric that is determined by one or more trusted individuals, or inferred based on who contributed the content item to server system 130 or how many people have interacted with (e.g., viewed, commented, liked, or shared) the content item. For example, one example filter criterion is the number of likes of a content item being at least two hundred. Thus, any content items, from content database 132, that have received less than two hundred likes will not be considered. As another example, if a particular member that has a high trust score with server system 130 authored a particular content item (or the particular member has a high reputation on or outside the online platform), then the particular content item is presumed to have high quality. One or more automatic analysis operations may be performed on the particular content item to catch glaring issues, but otherwise the particular content item is a candidate for notifying one or more out-of-network (with respect to the originator of the particular content item) members.

Another example filter criterion is a certain type(s) of interaction. For example, only content items that have been shared or posted are considered. An example of a content item that is neither shared nor posted is a content item reporting a work anniversary, which might not be "shareable."

Another example filter criterion is whether all references (e.g., uniform resource locator (URL)) in a content item belong to a domain whitelist. If any of the references in a content item (which might not include any) is not on the whitelist, then the content item is filtered out or excluded from further consideration. Similarly, another example filter criterion is whether none of the references in a content item belong to a domain blacklist. If any of the references in a content item is on the blacklist, then the content item is filtered.

Another example filter criterion is a particular action occurring in the last period of time (e.g., last three days). Examples of the particular action include being published, being first shared, and being last shared. For example, only content items that were published in the last week are selected for further consideration. As another example, only content items that have received a like or a share in the last day are selected for further consideration.

At step 220, the selected content items are assigned to topic buckets, each corresponding to a different topic. Example topics includes areas of study (e.g., computer science, software engineering, machine learning), industries (finance, marketing, real estate, engineering, manufacturing, food service), current topics in the news (e.g., blockchain, specific politicians, upcoming elections), sports (e.g., specific sports, specific teams, specific individuals), entertainment (e.g., specific actors, specific directors, specific movies, specific critics, specific books), and hobbies (e.g., surfing, mountain biking, traveling, parkour).

Each content item is associated with zero or more topics. The topics of a content item may be indicated in a record for the content item in content database 132. Alternatively, a separate content-to-topic mapping 222 associates content items with topics. Topics may be determined in any number of ways. In one technique, text of a content item is automatically analyzed to identify one or more keywords that are then used to look up one or more topics in a keyword-topic mapping. A keyword may map to multiple topics in the keyword-topic mapping. In another technique, the author or originator of a content item provides input that indicates one or more topics. The originator may manually type out the topic(s) (e.g., with a keyboard) and/or select the topic(s) from a drop-down menu.

In another technique to determine a topic, text of the content item is input to a topic model that takes, as input, words or sentences from the content item, and generates one or more content item embeddings. A content item embedding is a vector comprising multiple entries, each entry containing a value, such as a floating-point value. A content item embedding may be generated based on a single word, a single phrase, a sentence, multiple sentences, or the entire text of the content item. If multiple word/sentence embeddings or generated for a content item, then the word/sentence embeddings can be combined to generate a single embedding that represents the content item. The topic model is trained based on a text corpus. An example of an embedding generator is Word2vec. Each generated content item embedding is compared to a set of pre-defined (or previously-computed) topic embeddings. If a content item embedding is similar to a topic embedding, then the corresponding content item is assigned the corresponding topic. Embedding similarity may be determined in a number of ways, such as cosine similarity and cosine distance.

Word embedding is the collective name for a set of language modeling and feature learning techniques in natural language processing (NLP) where words or phrases from a vocabulary are mapped to vectors of real numbers. Conceptually, word embedding involves a mathematical embedding from a space with one dimension per word to a continuous vector space with a much lower dimension. Methods to generate an embedding include neural networks, dimensionality reduction on the word co-occurrence matrix, probabilistic models, explainable knowledge base method, and explicit representation in terms of the context in which words appear.

Whichever technique is used to associate content items with topics, such content-topic association may be performed before step 210.

Optionally, at step 230, for each topic bucket, content items that are assigned to the topic bucket are sorted. Example sorting criteria is popularity, such as number of likes, number of shares, number of comments, or any combination of the above. If a combination, then each type of interaction that is a positive interaction may be given a different weight. For example, a share is weighted higher than a like and a like is weighted higher than a share. Additionally, higher weight may be given to interactions from members that satisfy certain criteria, such as members that have a certain number of connections or that have been classified as "trusted" members. For example, a like from a first member may be weighted higher than a share from a second member even though, all else being equal, a like is generally weighted less than a share.

At step 240, multiple entities or members that satisfy one or more selection criteria are selected from member database 134. Example selection criteria include members having fewer than a certain number of connections (e.g., ten), members that have been registered with server system 130 for a certain period of time (e.g., less than two weeks), members that visit a web site hosted by server system 130 less than a certain frequency (e.g., once a month, three times a month, once a week), and members that are associated with less than a certain number of in-network notifications (e.g., two).

An in-network notification for a first member is a notification for a user-generated content item that was provided (or uploaded) by a second member that is in the same social network as the first user. In other words, the first member is a connection (or "friend") of the second member and vice versa. The set of members in step 240 are said to lack (or are likely to lack) "content liquidity," which refers to the amount of data or the number of in-network notifications that are available to send to a member at any one time. The lower a member's content liquidity, the higher the likelihood that the member will receive out-of-network notifications.

For example, a graph database is generated that indicates the network size of each of multiple users and a historical activity database is maintained to track user's historical online activities. A number of pieces of available content for each user is tracked along with a number of such pieces that have been consumed by each user. Based on these statistics, under-provisioned users are identified in step 240.

At step 250, the selected members are assigned to interest buckets, each corresponding to a different interest. Some members will be assigned to multiple interest buckets. Some members might not be assigned to any interest bucket. Interests of a member may be specified in a record that stores other data about the member, such as profile in member database 134. Alternatively, interests of each member are stored in a separate member-to-interest mapping 252. Interests of a member may be inferred (e.g., based on content items that the member has published, viewed, liked, commented, or shared) or explicitly follow. For example, a member might specify specific interests (or topics) in which the member the interested and would welcome content related to those interests.

Member-to-interest assignment may be performed in one or more ways. One technique involves accessing a member's (e.g., publicly available) profile that is stored in member database 134 (or in an affiliated system) and matching certain profile attribute values to interests. Example attributes include industry, job function, job title, skills, interests, employer, academic degree. For example, there may be industry-interest mapping, a job function-interest mapping, a job title-interest mapping, etc. Another technique involves identifying content items with which the member has interacted (if any), such as content items that the member has posted or authored, clicked, liked, commented, and shared. Topics of the identified content items are determined, for example, using one or more techniques described above for determining topics of content items.

At step 260, the topic-assigned content items are matched to interest-assigned members. For example, content items assigned to a content item bucket associated with a first topic are associated with each user that is assigned to a member bucket associated with an interest that maps to the first topic. For example, if three content items are assigned to the content item bucket for Financial News and two members are assigned to the member bucket for Financial News, then the three content items are associated with each of the two members. There may or may not be an exact correlation between a topic and an interest. Each interest may be topic and vice versa. Alternatively, the names of some topics may match specific interests while other topics might not match any interest. For example, a single interest may map to multiple topics and single topic may map to multiple interests. A separate mapping may be used that maps topics to interests.

A result of step 260 is a content-member assignment list that lists, for each indicated member, zero or more content items that are assigned to that member. The content-member assignment list may be pruned to remove any member that is not associated with at least one content item.

In an embodiment, instead of assigning each content item to one or more content item-topic buckets and each member to one or more member-interest buckets, each content item is associated with zero or more topics and each member is associated with zero or more interests. Then, a topic similarity score is generated by comparing a content item's topics with a member's interests/topics. In this way, a topic similarity score is generated between every selected content item and every selected member. The topic similarity score may be computed in a number of ways. For example, if there are two exact matches between a content item's topics and a member's topics, then the content item is a candidate for a notification to the member. As another example, an exact match is not required to be considered a match. For example, the topic of machine learning and the topic of artificial intelligence are not exact matches, but are semantically equivalent. As another example, the topic of Labradors may be considered a subset of the topic dogs and, thus, will have semantic similarity. Any technique for calculating a score that reflects semantic similarity of two topics may be used, such as cosine similarity of respective topic embeddings. If the sum of multiple semantic similarity scores is above a particular threshold, then the corresponding content item is a candidate for a notification to the member.

Process 200 may be performed at regular intervals, such as twice per day, daily, every two days, or weekly.

Second-Degree-Based Fanout

Figure 3:
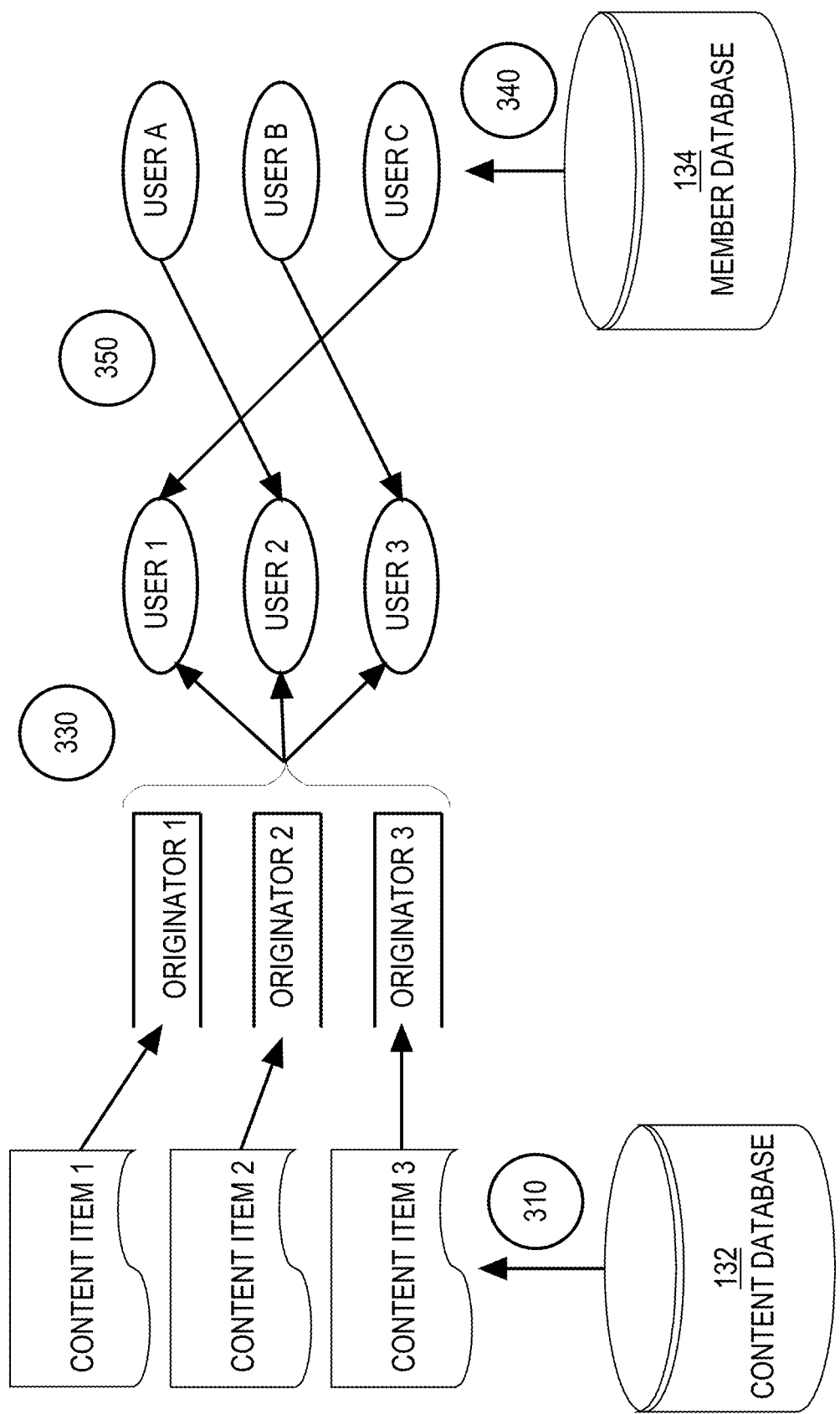
FIG. 3 is a block diagram that depicts another example workflow for generating notifications based on out-of-network content, in an embodiment.

FIG. 3 is a block diagram that depicts another example workflow 300 for generating notifications based on out-of-network content, in an embodiment. Workflow 300 may be implemented by content matcher 136.

At step 310, content items are selected from content database 132. Step 310 may involve first filtering out content items that have been classified as spam or low quality, such as by using spam models that predict whether a content item is spam based on multiple features of the content item. As another example, step 310 may involve selecting only content items with a certain number of (e.g., recent) online user interactions (e.g., number of likes, shares, etc.). Some of the same filtering criteria described above for filtering content items may be applied.

Optionally, at step 320, content items are sorted by quality. Again, quality may be measured in one of multiple ways. One example measure of quality is popularity, as determined based on a number of clicks of the content item, a number of likes of the content item, a number of comments on the content item, a number of shares of the content item. Another measure of quality is a trust score (or a reputation) related to the author of the content item. The more trustworthy the author, the more likely the content item will be highly regarded by others. Thus, the more trustworthy the author, the higher the measure of quality of the content item. Additionally, the higher the trust score (or reputation) of members who have liked, commented, or shared a content item, the higher the measure of quality of the content item.

At step 330, for each originator of a content item in the selected content items, one or more secondary-degree connections are identified. A second-degree connection of an entity or member is a connection of a connection of the member, or a friend of a friend of the member. A second-degree connection of a member may be identified by identifying a set of first-degree connections of the member and then, for each first-degree connection in the set, identify a set of first-degree connections of that first-degree connection. Each identified second-degree connection is associated with the content item of the originator that was used to identify the second-degree connection. For example, O→C1→C2, where O represents the originator of a content item, → represents first-degree connection link between two members, C1 represents a member that is a first-degree connection (or simply represents a first-degree connection) of O, and C2 represents a first-degree connection of C1 and a second-degree connection of O.

At step 340, multiple members that satisfy certain criteria are selected from member database 134. Step 340 may be similar to step 240. Step 340 may be performed before, after, or concurrently with steps 310-330.

At step 350, the second-degree connections identified in step 330 are matched to the members identified in step 330. Step 350 may involve a join of both sets of users: the second-degree connections identified in step 330 being one set of users and the members identified in step 340 being the other set of users. For each member that is the same as a second-degree connection, the one or more content items associated with the second-degree connection are associated with that member.

After step 350, there may be some members identified in step 340 that do not match any of the second-degree connections identified in step 330. In that case, those members will not receive a notification pertaining to any of the content items associated with the second-degree connections.

A result of step 350 is a content-member assignment list that lists, for each indicated member, zero or more content items. The content-member assignment list may be pruned to remove any member that is not associated with at least one content item.

In an embodiment, both workflow 200 and workflow 300 are merged to generate a single content-member assignment list. Such a merged list may indicate a first member who is associated with only one or more content items assigned as a result of workflow 200, a second member who is associated with only one or more content items assigned as a result of workflow 300, and/or a third member who is associated with (1) content items assigned as a result of workflow 200 and (2) content items assigned as a result of workflow 300.

Generating a Notification

Notification generator 138 receives the content-member assignment list and for each member indicated in the assignment list, retrieves a member identifier and a list of one or more content items, and causes a notification of each content item in the list to be sent to a computing device of the corresponding member.

In an embodiment, notification generator 138 determines whether the member is currently active. An "active" member is one whose account activity indicates that a client application (whether a mobile application or a web application) is currently open or displayed. If a member is not active, then notification generator 138 generates and transmits, over a network (e.g., network 120), a push notification (e.g., in an HTTP message) to a computing device of the member. An identifier of the computing device may be retrieved from member account data that associates a member with one or more computing devices. Alternatively, notification generator 138 updates an account of the member (e.g., in member database 134) to include the generated notification. Thus, when the account is later read by a server process in response to a request from a client application, a notification indication (whether the notification itself or other data indicating that a notification is available) is retrieved and transmitted (e.g., in an HTTP message) to the client application.

If the member is active, then notification generator 138 generates and sends, over a network (e.g., network 120), an in-app notification (e.g., in an HTTP message) to the computing device on which the active client application is currently executing.

As described herein, a notification may contain at least some content from the corresponding content item. A notification may also include other data, such as an identity of the originator (e.g., a first name and last name), a connection indication that indicates how the originator and the target member (or recipient) are related to each other in a larger social network (particularly if workflow 300 was used to identify the content item), a quality rating of the content item (e.g., determined automatically based on the originator of the content item and/or those who have interacted with the content item), one or more user interaction metrics pertaining to the content item (e.g., a number of likes, comments, shares), and one or more topics that are reflected in the content item (particularly if workflow 200 was used to identify the content item). A connection indication may list the names of one or more members who are "between" the originator and the target member in a social network, such as a common connection if the target member and the originator are only two degrees of separation away from each other.

Such data about a content item will help a targeted member understand why s/he is receiving a ("out-of-network") notification of the content item. Typically, notifications transmitted to a member are only ones in which the originators of the notified content are "in-network" with respect to the member. With knowledge of why a member is receiving an out-of-network notification, the member is more likely to find value in the content item and in the online service providing the notifications.

Language Check

In an embodiment, prior to generating a notification for a content item, notification generator 138 (or another component of server system 130) determines a language of a member and of the content item(s) assigned to the member. If a content item assigned to a member is associated with a different language than all of the languages associated with the member, then the content item is removed and a notification is not generated based on the content item. A member may be associated with multiple languages, which are indicated in the member's profile (e.g., stored in member database 134). A content item is associated with one or more languages and may be indicated in a record for the content item (e.g., stored in content database 132). If a content item is associated with multiple languages, then a member must be associated with each of the languages in order for a notification of the content item to be sent to a computing device of the member.

Deduplication

In an embodiment, to ensure that the same notification is not sent to a member twice, notification generator 138 (or another component of server system 130) performs a deduplication operation. Each time a notification is transmitted to a computing device of a member, a notification record for the member is updated. The notification record lists content items for which notifications have been sent to the member. Different notifications may have been sent to different computing devices associated with the member. A deduplication operation involves checking a notification record to determine whether the notification record already indicates a candidate content item. If so, then a notification for the candidate content is not sent to a computing device of the member. Otherwise, a notification is sent and the notification record is updated.

Selecting a Content Item for a Notification

After workflows 200 and/or 300, a member may be associated with one or more candidate content items. As described herein, notification generator 138 may generate a notification for each content item assigned to that member.

Alternatively, a set of one or more content items is selected from among the multiple candidate content items for one or more notifications to be transmitted to the member. A separate notification is sent for each selected content item. The set of one or more content items may be selected in one or more ways. For example, the set of one or more content items may be selected randomly. This is referred to as the "random selection approach."

As another example, the candidate content items may be ranked and the top N (e.g., one or two) are selected. In an embodiment, multiple factors are considered in ranking the candidate content items. This is referred to as the "ranked selection approach." Example factors include a similarity between the member and the originator of the content item, a popularity of the content item, a (e.g., topic) similarity between the content item and the member, and an affinity between the member and the originator.

One or more factors may be normalized before combining to generate a score for a candidate content item. For example, while the processes for computing a member similarity measure and a topic similarity measure may be designed to provide a value between 0 and 1, a process for computing a popularity value might not, in which case each popularity value might be normalized to a value between 0 and 1.

An example formula for generating a score for a candidate content item based on the above factors is the following:

$$P(user_i, content_j, actor_k) = a_1 pymk(i,k) + a_2 popularity(j) + a_3 similarity(i,f) + a_4 eAffinity(i,k)$$

where $user_i$ is the member that is being targeted with one or more notifications, $content_j$ is the candidate content item, $actor_k$ is the member that originated or authored the candidate content item, pymk is a function that processes data about $user_i$ and $actor_k$ and outputs a member similarity measure (or a measure of the likelihood of $user_i$ knowing $actor_k$), popularity is a function that processes historical user interaction data pertaining to $content_j$ and outputs a popularity measure of $content_j$, similarity is a function that processes data about $user_i$ and $content_j$ and outputs a similarity measure between the two, eAffinity is function that processes data about $user_i$ and $actor_k$ and outputs an affinity measure between the two, and $a_1$-$a_4$ are the weights for the respective factors.

Each factor may be (at least initially) weighted using manually-tuned weights. For example, each of $a_1$-$a_4$ may be 1, indicating that the factors are weighed equally with respect to each other. As another example, one or more of $a_1$-$a_4$ are different from the other weights, indicating that some factors are weighted more than others.

A similarity between the member and the originator of a candidate content item (referred to herein as "member similarity") may be measured in a number of ways. For example, if the member and the originator work for the same organization at the same time (whether currently or sometime in the past), then a member similarity score increases and the more likely that the member knows the originator. This is referred to as organization overlap. As another example, if the member and the originator attended the same academic institution at the same time (whether currently or sometime in the past), then the member similarity score increases and the more likely that the member knows the originator. This is referred to as school overlap. The more recent an overlap, the higher the member similarity score. A weight to an organization overlap may generally be higher than a weight to a school overlap. Other factors that may be considered in generating a member similarity score include geographic information (e.g., whether they live in the same city or region), industry (e.g., whether they work in the same industry), job function (e.g., whether they have the same job function), job title (e.g., whether they have the same job title), recommendations (e.g., whether the same person or people have individually recommended them), and skills (e.g., a number skills that they have in common).

A popularity of a content item may be measured in a number of ways, such as a number of clicks, likes, shares, and comments. Different types of interactions may have a different effect on a popularity score for a content item. For example, a share is worth more than a like, which is worth more than a comment, which is worth more than a click.

Topic similarity between a member and a content item may be measured in a number of ways, such as is described herein. Even though topic similarity might not have been used to match the content item to the member (e.g., if workflow 300 is used instead of workflow 200), topic similarity may be used at this stage to score the candidate content item so that it may be ranked relative to other scored candidate content items.

An affinity between a member and an originator may be measured in a number of ways. Because the member and the originator are not first-degree connections of each other, affinity may be measured based on whether the originator has interacted with content that the member posted/shared/liked/commented and/or based on whether the member has interacted with content that the originator previously posted/shared/liked/commented. For example, if the member has already liked another content item posted by the originator, then an affinity score between those two individuals increases. As another example, if the originator commented on an online article that the member previously liked, then the affinity score increases. If the member and/or the originator is relatively new, then it may be likely that the affinity score is low, indicating low or no affinity.

In an embodiment, content items are selected for different members using multiple selection approaches; for example, the random selection approach and the ranked selection approach. For example, for half of the selected members (i.e., who are under provisioned or lack content liquidity), the random selection approach is used and for the other half of the selected members, the ranked selection approach is used.

Machine-Learned Model

In a related embodiment, one or more machine learning techniques are used to train a prediction model that is used to score multiple candidate content items for a member and the top N highest scoring candidate content items are selected for notification(s).

Machine learning is the study and construction of algorithms that can learn from, and make predictions on, data. Such algorithms operate by building a model from inputs in order to make data-driven predictions or decisions. Thus, a machine learning technique is used to generate a statistical or classification model that is trained based on a history of attribute values associated with metadata, content items, and other data extracted from the videos. The machine-learned model is trained based on multiple attributes (or factors) described herein. In machine learning parlance, such attributes are referred to as "features."

To generate and train a machine-learned model, a set of features is specified and training data is generated. The set of features dictates how data that is collected and processed in order to generate the training data and to eventually generate input for the trained model. For example, if a similarity between two members is a feature or class of features, then profiles of the members are accessed to determine, for example, a number of profile attributes that are common.

The training data that is used to train the prediction model comprises multiple training instances, each corresponding to a different instance of a content item that was selected for a notification to a member. Some content items may have been selected for a notification to multiple members, in which case multiple training instances may correspond to the same content item, but to different members. Thus, the feature values of such training instances would not be identical. A training label indicates whether the member interacted with the content item as a result of the notification (and, optionally, if there was an interaction, a type of the interaction). For example, a label of '0' indicates that the member did not interact with the content item, while a label of '1' indicates that the member did interact with the content item, such as a like, a share, or a comment. As another example, a label of '0' indicates that the member did not interact with the content item, a label of '0.5' indicates that the member commented on the content item, a label of '0.8' indicates that the member liked the content item, and a label of '1.3' indicates that the member shared the content item. The features of the model may be the same factors mentioned above. Thus, each training instance includes a computed value for each of the features. After the machine learning techniques are applied to the training data, the prediction model comprises automatically "learned" (or tuned) weights.

In an embodiment, a new machine-learned model is generated regularly, such as every month, week, or other time period. Thus, the new machine-learned model may replace a previous machine-learned model. Newly acquired or changed training data may be used to update the model. For example, additional training data may be added to the model in order to produce a better prediction of standalone classification. As another example, the model may be updated if feature values of the existing training data have been changed. For example, two members that did not had few similarities last month may update their respective profiles that happen to now indicate commonalities.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
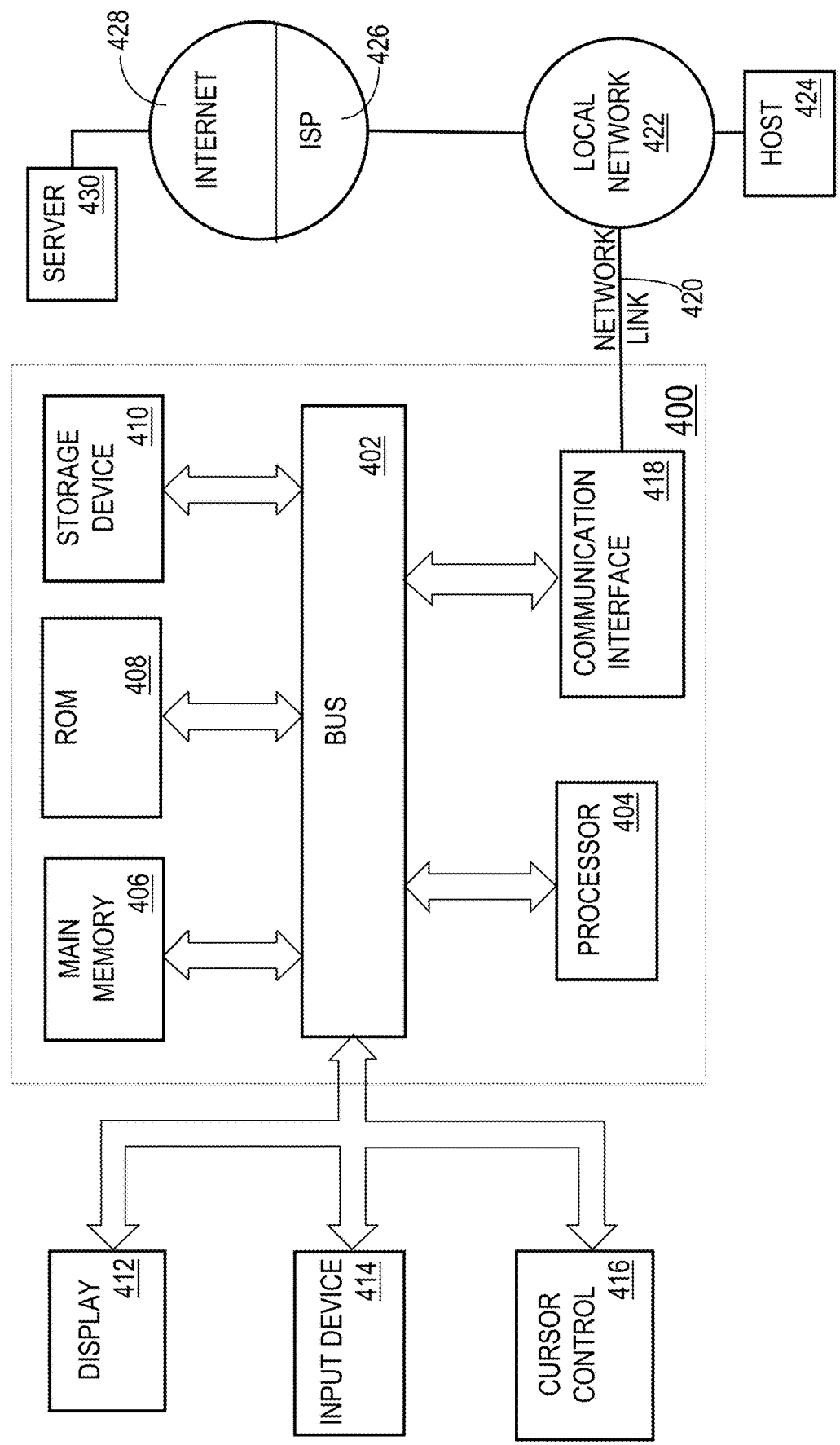
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    selecting a plurality of target entities from a set of target entities based on one or more selection criteria;
    for each target entity in the plurality of target entities:
        identifying one or more first interests associated with said each target entity;
        for each interest of the one or more first interests, assigning said each target entity to said each interest;
    selecting a plurality of content items from a set of content items based on one or more measures of quality, wherein a measure of quality of a content item is based on one or more of a number of likes of the content item, a number of shares of the content item, a number of clicks on the content item, a number of comments on the content item, a relevance model whose input is multiple features of the content item, an identity of an originator of the content item, or identities of entities who have interacted with the content item;
    for each content item in the plurality of content items:
        identifying one or more topics associated with said each content item;
        for each topic of the one or more topics, assigning said each content item to said each topic;
    matching the interests associated with the plurality of target entities to the topics associated with the plurality of content items, wherein matching comprises assigning, for each target entity of the plurality of target entities, zero or more content items to said each target entity;
    for each target entity that is assigned one or more content items based on the matching:
        generating a notification based on at least one of the one or more content items, and causing the notification to be transmitted over a computer network to a computing device of said target entity;

wherein the method is performed by one or more computing devices.

2. The method of claim 1, wherein the one or more selection criteria includes one or more of a target entity: having less than a particular number of available notifications, having less than a particular number of network connections, having registered with an online network provider within a particular period time, having visited an online network system less than a particular number of times, having less than a particular number of online interactions with content provided through the online network system, or contributing less than a particular number of content items to the online network system.

3. The method of claim 1, wherein the measure of quality of the content item are based on one or more of the number of likes of the content item, the number of shares of the content item, the number of clicks on the content item, the number of comments on the content item, the identity of the originator of the content item, or the identities of entities who have interacted with the content item.

4. The method of claim 1, further comprising:
for each topic of one or more topics in a plurality of topics, sorting the content items that are assigned to said each topic based on one or more of the one or more measures of quality.

5. The method of claim 1, further comprising:
prior to generating a particular notification for a particular content item assigned to a particular target entity of the plurality of target entities, determining whether the particular target entity has previously been notified of the particular content item;
transmitting the particular notification to the particular target entity only in response to determining that the particular target entity has not previously been notified of the particular content item.

6. The method of claim 1, further comprising:
prior to generating a particular notification for a particular content item assigned to a particular target entity of the plurality of target entities:
determining a first language associated with the particular target entity;
determining a second language associated with the particular content item;
transmitting the particular notification to the particular target entity in response to determining that the first language matches the second language.

7. The method of claim 1, further comprising:
after a first plurality of target entities have been notified, respectively, of a first plurality of content items, identifying entity interaction data that indicates, for each content item of the first plurality of content items, whether a corresponding target entity of the first plurality of target entities has interacted with said each content item;
based on the entity interaction data, using one or more machine learning techniques to train a prediction model;
for each entity-content item pair of a plurality of entity-content item pairs, using the prediction model to compute a score that indicates a likelihood of the target entity of said each entity-content item pair will interact with the content item of said each entity-content item pair, wherein the target entity of said each entity-content item pair is the same as the target entity of each other pair in the plurality of entity-content item pairs;
based on a plurality of scores computed by the prediction model, selecting a particular content item from among the plurality of entity-content item pairs;
generating a particular notification based on the particular content item;
causing the particular notification to be transmitted over the computer network to a particular computing device of the target entity of the plurality of entity-content item pairs.

8. The method of claim 1, further comprising:
based on the matching, identifying one or more particular content items for a particular target entity of the plurality of target entities;
selecting a subset of the set of content items;
performing a network search comprising, for each content item in the subset of the set of content items:
identifying a particular originator of said each content item;
identifying a first plurality of connections of the particular originator;
for each connection in the first plurality of connections of the particular originator:
identifying a second plurality of connections, of said each connection, who are not a connection of the particular originator;
associating said each content item with each connection in the second plurality of connections;
adding the second plurality of connections to a set of candidate target entities;
matching the set of candidate target entities with a subset of the set of target entities, wherein matching the set of candidate target entities with the subset of the set of target entities comprises determining that a particular candidate target entity in the set of candidate target entities matches the particular target entity;
identifying a certain content item that is associated with the particular candidate target entity based on the associating;
combining the certain content item with the one or more particular content items to form a group of content items;
selecting a first content item from the group of content items;
generating a second notification based on the first content item;
causing the second notification to be transmitted over the computer network to a particular computing device of the particular target entity.

9. The method of claim 1, wherein the at least one of the one or more content items is a particular content item; wherein the notification comprises two or more of:
a portion of the particular content item;
an identity of a particular originator of the particular content item;
a connection path between said each target entity and the particular originator;
entity interaction data indicating a quantity of one or more types of interactions by other entities with the particular content item; or
one or more topics associated with the particular content item.

10. The method of claim 1, further comprising:
determining that a first plurality of content items are assigned to particular target entity of the plurality of target entities as a result of the matching;

for each content item of the first plurality of content items, determining a plurality of measures that comprise one or more of:
  an entity similarity measure indicating a measure of similarity between the particular target entity and particular originator of said each content item;
  a topic similarity measure indicating a measure of similarity between one or more topics associated with the particular target entity and one or more topics associated with said each content item;
  a popularity measure indicating a measure of popularity of said each content item; or
  an affinity measure indicating a level of interaction between content consumed by both the particular target entity and the particular originator of said each content item;
based on the plurality of measures determined for each content item of the first plurality of content items, generating a score for said each content item;
based on the score for each content item in the first plurality of content items, ranking the first plurality of content items;
generating a particular notification based on the highest ranked content item of the first plurality of content items;
causing the particular notification to be transmitted over the computer network to a particular computing device of the particular target entity.

11. A method comprising:
selecting a plurality of target entities from a set of target entities based on one or more selection criteria;
selecting a plurality of content items from a set of content items;
performing a network search comprising, for each content item in a subset of the plurality of content items:
  identifying an originator of said each content item;
  identifying a first plurality of connections of the originator;
  for each connection in the first plurality of connections of the originator:
    identifying a second plurality of connections, of said each connection, who are not a connection of the originator;
    associating said each content item with each connection in the second plurality of connections;
    adding the second plurality of connections to a set of candidate target entities;
matching the set of candidate target entities with the plurality of target entities, wherein matching comprises determining that a particular candidate target entity in the set of candidate target entities matches a particular target entity in the plurality of target entities;
identifying a particular content item that is associated with the particular candidate target entity based on the associating;
generating a notification based on the particular content item;
causing the notification to be transmitted over a computer network to a computing device of the particular target entity;
wherein the method is performed by one or more computing devices.

12. The method of claim 11, wherein the one or more selection criteria includes one or more of a target entity:
  having less than a particular number of available notifications,
  having less than a particular number of network connections,
  having registered with an online network provider within a particular period time,
  having visited an online network system less than a particular number of times,
  having less than a particular number of online interactions with content provided through the online network system,
  or contributing less than a particular number of content items to the online network system.

13. The method of claim 11, wherein:
selecting the plurality of content items comprises selecting the plurality of content items based on one or more measures of quality;
the one or more measures of quality of a content item are based on one or more of a number of likes of the content item, a number of shares of the content item, a number of clicks on the content item, a number of comments on the content item, an identity of a particular originator of the content item, and identities of entities who have interacted with the content item.

14. The method of claim 11, further comprising:
prior to generating the notification, determining whether the particular target entity has previously been notified of the particular content item;
transmitting the notification to the particular target entity only in response to determining that the particular target entity has not previously been notified of the particular content item.

15. The method of claim 11, further comprising:
prior to generating the notification:
  determining a first language associated with the particular target entity;
  determining a second language associated with the particular content item;
transmitting the notification to the particular target entity only in response to determining that the first language matches the second language.

16. The method of claim 11, further comprising:
after a first plurality of target entities have been notified, respectively, of a first plurality of content items, identifying entity interaction data that indicates, for each content item of the first plurality of content items, whether a corresponding target entity of the first plurality of target entities has interacted with said each content item;
based on the entity interaction data, using one or more machine learning techniques to train a prediction model;
for each entity-content item pair of a plurality of entity-content item pairs, using the prediction model to compute a score that indicates a likelihood of the target entity of said each entity-content item pair will interact with the content item of said each entity-content item pair, wherein the target entity of said each entity-content item pair is the same as the target entity of each of other pair in the plurality of entity-content item pairs;
based on a plurality of scores computed by the prediction model, selecting a certain content item from among the plurality of entity-content item pairs;
generating a particular notification for the certain content item;

causing the particular notification to be transmitted over the computer network to a particular computing device of the target entity of the plurality of entity-content item pairs.

17. The method of claim 11, further comprising:
based on the matching, identifying one or more certain content items for a certain target entity of the plurality of target entities;
for each content item in a subset of the set of content items:
  identifying one or more first topics that are associated with said each content item;
  for each topic of the one or more first topics, assigning said each content item to a content-topic bucket for said each topic;
  wherein the content-topic bucket is one of a plurality of content-topic buckets;
for each target entity in a subset of the set of target entities:
  identifying one or more second topics that are associated with said each target entity;
  for each topic of the one or more second topics, assigning said each target entity to an entity-topic bucket for said each topic;
  wherein the entity-topic bucket is one of a plurality of entity-topic buckets;
matching the plurality of entity-topic buckets to the plurality of content-topic buckets, wherein matching the plurality of entity-topic buckets to the plurality of content-topic buckets comprises assigning, for each target entity in the subset of the set of target entities, zero or more content items to said each target entity;
identifying a certain content item that is associated with the certain target entity based on the assigning;
combining the certain content item with the one or more certain content items to form a group of content items;
selecting a first content item from the group of content items;
generating a second notification based on the first content item;
causing the second notification to be transmitted over the computer network to a particular computing device of the certain target entity.

18. The method of claim 11, wherein the notification comprises two or more of:
a portion of the particular content item;
an identity of a particular originator of the particular content item;
a connection path between the particular target entity and the particular originator of the particular content item;
entity interaction data indicating a quantity of one or more types of interactions by other entities with the particular content item; or
one or more topics associated with the particular content item.

19. The method of claim 11, further comprising:
determining that a first plurality of content items are assigned to a certain target entity of the plurality of target entities as a result of the matching;
for each content item of the first plurality of content items, determining a plurality of measures that comprise one or more of:
  an entity similarity measure indicating a measure of similarity between the certain target entity and a particular originator of said each content item;
  a topic similarity measure indicating a measure of similarity between one or more topics associated with the certain target entity and one or more topics associated with said each content item;
  a popularity measure indicating a measure of popularity of said each content item; or
  an affinity measure indicating a level of interaction between content consumed by both the certain target entity and the particular originator of said each content item;
based on the plurality of measures determined for each content item of the first plurality of content items, generating a score for said each content item;
based on the score for each content item in the first plurality of content items, ranking the first plurality of content items;
generating a particular notification based on the highest ranked content item of the first plurality of content items;
causing the particular notification to be transmitted over the computer network to a particular computing device of the certain target entity.

20. A system comprising:
one or more processors;
one or more storage media storing instructions which, when executed by the one or more processors, cause:
  identifying a plurality of candidate content items and, for each candidate content item of the plurality of candidate content items, identifying one or more topics associated with said each candidate content item;
  for each topic of a first plurality of topics, sorting, based on one or more quality measures, a subset of the plurality of candidate content items that are associated with said each topic to generate sorted data for said each topic;
  identifying, from a set of target entities, a plurality of target entities that have fewer than a particular number of connections, are associated with less than a certain number of in-network notifications, have registered with an online network provider within a particular period time, have visited an online network system less than a particular number of times, have less than a particular number of online interactions with content provided through the online network system, or have contributed less than a particular number of content items to the online network system;
  for each topic of a second plurality of topics, identifying one or more target entities of the plurality of target entities that are associated with said each topic to generate entity identification data for said each topic;
  matching topics of the first plurality of topics with topics of the second plurality of topics, based on the sorted data and the entity identification data;
  for each target entity of the plurality of target entities, identifying one or more candidate content items to send over a computer network to a computing device of said each target entity.

\* \* \* \* \*